US011626911B2

(12) United States Patent
Bengtsson et al.

(10) Patent No.: US 11,626,911 B2
(45) Date of Patent: Apr. 11, 2023

(54) FLEXIBLE BEAMFORMING CONTROL

(71) Applicant: Sony Corporation, Tokyo (JP)

(72) Inventors: Erik Bengtsson, Eslov (SE); Olof Zander, Sodra Sandby (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/960,870

(22) PCT Filed: Jan. 10, 2019

(86) PCT No.: PCT/EP2019/050526
§ 371 (c)(1),
(2) Date: Jul. 8, 2020

(87) PCT Pub. No.: WO2019/137989
PCT Pub. Date: Jul. 18, 2019

(65) Prior Publication Data
US 2020/0373983 A1  Nov. 26, 2020

(30) Foreign Application Priority Data

Jan. 10, 2018  (SE) .................................. 1830006-1

(51) Int. Cl.
*H04B 7/06* (2006.01)
*H04B 7/0456* (2017.01)
*H04L 25/02* (2006.01)

(52) U.S. Cl.
CPC ......... *H04B 7/0617* (2013.01); *H04B 7/0456* (2013.01); *H04L 25/0204* (2013.01); *H04L 25/0224* (2013.01)

(58) Field of Classification Search
CPC ... H04B 7/0617; H04B 7/0456; H04L 5/0035; H04L 25/0204; H04L 25/0224
See application file for complete search history.

(56) References Cited

U.S. PATENT DOCUMENTS

2010/0182922 A1* 7/2010 Iwami ................. H04B 7/0617
370/252
2014/0050278 A1* 2/2014 Bergman ............. H04B 7/0689
375/267
(Continued)

FOREIGN PATENT DOCUMENTS

CN      103733542 A    4/2014
EP      1912347 A1     4/2008
(Continued)

OTHER PUBLICATIONS

International Search Report and Written Opinion from corresponding International Application No. PCT/EP2019/050526, dated Apr. 8, 2019, 12 pages.
(Continued)

*Primary Examiner* — Sung S Ahn
(74) *Attorney, Agent, or Firm* — Tucker Ellis LLP (57) ABSTRACT

A method of operating a device (101, 102) includes selecting between a first operational mode (8098) and a second operational mode (8099) for a wireless link (111) established between a terminal (102) and a base station (101) of the network; in response to selecting the first operational mode (8098): determining first values for antenna weights from a plurality of predefined candidate values; and in response to selecting the second operational mode (8099): determining second values for the antenna weights based on a calculation using a receive property of pilot signals (4021) communicated between the terminal (102) and the base station (101) as an input.

14 Claims, 8 Drawing Sheets

(56) References Cited

U.S. PATENT DOCUMENTS

| | | | |
|---|---|---|---|
| 2014/0055302 A1* | 2/2014 | Jia ........................ | H04B 7/0695 |
| | | | 342/372 |
| 2016/0198474 A1* | 7/2016 | Raghavan ............ | H04B 7/0617 |
| | | | 370/335 |
| 2018/0227037 A1* | 8/2018 | Ahmed Ouameur ........................ | |
| | | | H04B 7/0413 |

FOREIGN PATENT DOCUMENTS

| | | | |
|---|---|---|---|
| GB | 2543563 A | 4/2017 | |
| WO | 2008125021 A1 | 10/2008 | |

OTHER PUBLICATIONS

Catt et al., "Downlink reference signal aspects for non-codebook based pre-coding in TDD mode", 3 GPP TSG RAN WG1 Meeting #48bis, R1-071746, Apr. 3, 2007, 3 pages.

MediaTek Inc., "Beam Sweeping Design Issues in NR", GPP TSG RAN WG1 Meeting #85, R1-167525, Aug. 22-26, 2016, 5 pages.

Office Action from corresponding Chinese Application No. 201980007711.2 dated Oct. 27, 2021.

* cited by examiner

FLEXIBLE BEAMFORMING CONTROL

TECHNICAL FIELD

Various embodiments of the invention generally relate to determining values for antenna weights. Various examples of the invention specifically relate to activating different operational modes associated with the determining of the values for the antenna weights.

BACKGROUND

Beamforming techniques are becoming increasingly popular for wireless transmission. One advantage of beamforming is the ability to transmit on high carrier frequencies by increasing antenna aperture, e.g., above 6 GHz and even up to 60 GHz or beyond. Large bandwidths may be achieved. Another advantage of beamforming is the availability of spatial multiplexing, thereby increasing spectral efficiency. The overall antenna efficiency can be increased.

Various applications of beamforming are envisioned in the Third Generation Partnership Project (3GPP) New Radio (NR) or 5G communication system.

Within the scope of 3GPP NR, the devices—such as terminals/user equipments (UEs) and base stations (BS)—shall be able to communicate with significantly higher radio frequencies than the existing 3GPP standards such as Wideband Code Division Multiple Access (WDCMA) and Long Term Evolution (LTE). Examples of such higher frequencies are within 20-40 GHz, in addition to the communication bandwidths around 1-2 GHz that are specified for the legacy 3GPP standards. The higher frequencies are sometimes referred to as "mmWave" frequencies, since the wavelength is approaching same order of magnitudes as a millimeter.

When communicating at these high frequencies and thereby small wavelengths, the dimensions of each antenna element become quite small. Thus, there is the opportunity to include many more antenna elements for mmWave communication for a given physical size of an antenna patch—sometimes also referred to as module or panel —, than it would for a e.g. 1 GHz modem. Also, since the radio propagation loss is scaled with frequency, a high antenna gain is required to provide reasonable system coverage when communicating using mmWave frequencies.

All in all, this results in typical implementations of transmitter and/or receiver in which the antenna patches are combining phased-array transmissions/receptions in accordance with certain values determined for antenna weights of multiple antenna elements for the same data stream, efficiently creating a transmission directivity. Here, the antenna gain in a certain direction is often several dBs higher than the gain from a single antenna element. As a rule of thumb, increases of 6 dB per doubling the count of antenna elements has been observed. The phase-coherent superposition of transmitting and/or receiving (communicating) on a plurality of antenna elements of an antenna patch is referred to as beamforming. The amplitude and phase relationship between the different antenna elements are specified by the specific values of antenna weights, where each value of the antenna weights is indicative of the amplitude and phase of a given antenna element of an antenna patch. Different values of the antenna weights are associated with different beams; beams may differ in terms of direction, beam width, etc. By changing the value of the antenna weights or alternate between using different antenna elements to form beams, it is possible to switch between different beams (beam switching). Different gain can be achieved for different directions.

Beamforming may generally be employed for receiving signals (receive beamforming) and/or for transmitting signals (transmit beamforming). The use of multiple antenna elements is sometimes referred to as Multiple Input Multiple Output (MIMO).

When using beamforming, the direction of the beam may have a significant impact on the link performance. This is because of the transmission characteristics varying for different spatial propagation paths that are defined by the beams. For example, a particular low path loss may be expected for transmission along a line-of-sight spatial propagation channel. Generally, a beam directed in the right direction will improve the link budget with many dBs.

According to reference implementations, typically at high frequencies beam sweeps are employed in order to determine the values of the antenna weights, i.e., in order to identify the appropriate beam.

In a beam sweep, one or more pilot signals are transmitted—either in sequence or at least partly in parallel, e.g., using frequency-division duplexing (FDD)—on multiple beams; based on a receive property of the pilot signal, it is then possible to identify the appropriate beam. Beam management may include signaling methods to support selecting a proper beam configuration, or indicating that beam switching is needed etc. Beam management may include the routine for repeated beam sweeps to avoid a degradation of the link performance.

It has been observed that employing beam sweeps requires significant resources. For mobility reasons, beam sweeps may have to be repeated at a comparably high periodicity; therefore, control overhead is significant. Often, beam management requires continuous, dedicated beam sweep to search for redundant beams.

SUMMARY

Therefore, a need exists for advanced techniques of determining values for antenna weights. Specifically, a need exists for techniques which overcome or mitigate at least some of the above-identified restrictions and drawbacks. This need is met by the features of the independent claims. The features of the dependent claims define embodiments.

A method of operating a device includes activating an operational mode of a plurality of operational modes of a wireless link. The wireless link is established between a terminal and a base station of a network. The method also includes determining first values for antenna weights from a plurality of predefined candidate values, in response to activating a first operational mode of the plurality of operational modes. The method also includes determining second values for the antenna weights, in response to activating a second operational mode of the plurality of operational modes. The second values are determined based on a calculation. The calculation uses a receive property of pilot signals communicated between the terminal and the base station as an input.

A computer program product or computer program includes program code. Execution of the program code causes control circuitry to perform a method of operating a device. The method includes activating an operational mode of a plurality of operational modes of a wireless link. The wireless link is established between a terminal and a base station of a network. The method also includes determining first values for antenna weights from a plurality of predefined candidate values, in response to activating a first operational mode of the plurality of operational modes. The method also includes determining second values for the antenna weights, in response to activating a second operational mode of the plurality of operational modes. The second values are determined based on a calculation. The calculation uses a receive property of pilot signals communicated between the terminal and the base station as an input.

A device includes control circuitry. The control circuitry is configured to perform a method. The method includes activating an operational mode of a plurality of operational modes of a wireless link. The wireless link is established between a terminal and a base station of a network. The method also includes determining first values for antenna weights from a plurality of predefined candidate values, in response to activating a first operational mode of the plurality of operational modes. The method also includes determining second values for the antenna weights, in response to activating a second operational mode of the plurality of operational modes. The second values are determined based on a calculation. The calculation uses a receive property of pilot signals communicated between the terminal and the base station as an input.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network including multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

The techniques described herein may facilitate determining beams used for transmission of data—e.g., payload data such as application data or control data such as Layer 2 or Layer 3 control data. As such, the techniques described herein may generally facilitate efficient beamforming and/or spatial diversity. Facilitating beamforming may, in turn, facilitate spatial multiplexing and high frequencies, e.g., above 6 GHz or 10 GHz or even above 50 GHz. The bandwidth can be in the range of 100 MHz and 1 GHz. By using certain values of antenna weights, a well-defined spatial profile of the wireless transmission via the plurality of antenna elements may be obtained, typically referred to as a beam. The beam may thus define a directivity of transmitting and/or receiving. The spatial profile may define a certain width and amplitude of the beam. The spatial profile may define side lobes which may be suppressed if compared to a central peak of the beam. The spatial profile may be associated with a propagation channel of the respective signals; here, the propagation channel may include one or more reflections, etc.

The techniques described herein facilitate determining values for antenna weights. Specifically, according to various examples described herein, the values of the antenna weights can be efficiently and accurately determined. For example, control overhead required for determining the values of the antenna weights can be reduced if compared to reference scenarios. The latency of determining the antenna weights can be reduced. At the same time, the appropriate beam may be identified at high accuracy.

According to examples, multiple operational modes for a wireless link between an UE and the BS are available for activation. Here, the different operational modes may be associated with different strategies of determining the values of the antenna weights. By having the flexibility to activate different operational modes of a plurality of operational modes, situation-aware determining of the values of the antenna weights can be implemented. As such, multiple operational modes may be referred to as channel sounding operational modes.

Specifically, it may be possible to tailor the operational mode depending on the various decision criteria. The activation of the appropriate operational mode can be based on one or more of the following parameters: channel strength of communication on the wireless link; received power level at the BS; received power level at the UE; transmit power level at the BS; transmit power level at the UE; bit error rate (BER); need for robustness, e.g., in view of mobility; need for low latency; number of available beams, e.g., associated with an indication of a channel richness; power setting demanded by the BS; interference situation, given that the selected beam may change the interference situation in a signal as the signal is distributed, e.g., with lower power compared to another beam.

As a general rule, selection of the operational mode to be activated may involve logic at the BS and/or may involve logic at the UE. For example, the decision making process may be situated at the UE or, at least in parts, at the BS.

In any case, activation of the appropriate operational mode may be synchronized between the BS and the UE. Hence, activation of the operational mode may be communicated as control signaling on the wireless link. This may involve UL and/or DL control signaling. As a general rule, different options are available for such control signaling, wherein different options may involve a different amount of control signaling. In a first option, the BS may enforce activation of a certain operational mode. Here, the decision making process can be situated in the BS and DL control signaling can be used to trigger aligned activation at the UE. In a second option, the operational mode to be activated may be negotiated between the BS and the UE; this may involve two-way control signaling, including UL and DL. As an example, the BS may request a certain operational mode and the UE may accept or decline, based on its capabilities. In a third option, the UE may request activation of a certain operational mode and the BS may accept or decline, e.g., based on various decision criteria such as cell status and/or capability. Again, this may involve two-way control signaling.

As a general rule, different operational modes may be subject to the flexible activation as described herein. This may involve activation of the appropriate operational mode selected from two or more operational modes.

A first operational mode may be labeled codebook (CB) operational mode. The CB operational mode may determine associated values for the antenna weights from a plurality of predefined candidate values of the antenna weights. For example, these candidate values may be included in a CB. Each entry in the CB may be associated with a beam. The CB may be network-controlled; for example, if multiple candidate values are available, then the BS may activate the appropriate value and signal its choice to the UE. Hence, in the CB operational mode, the result space of possible values of the antenna weights to be determined is limited and discrete. Such a scenario is typically encountered where the values of the antenna weights are determined in accordance with one or more beam sweeps. For example, a DL transmit beam sweep may be employed at the BS and a DL receive beam sweep may be employed at the UE. Alternatively or additionally, it would also be possible to perform an UL transmit beam sweep at the UE and perform an UL receive beam sweep at the BS. Here, a beam sweep may include transmission and/or reception of pilot signals on multiple beams of the beam sweep. For example, all or at least some candidate values of antenna weights included in the CB may be covered by the beam sweep. By comparing the receive properties—e.g., amplitude and/or phase and/or signal strength, etc. —of the pilot signals communicated on the various beams of the beam sweep, it becomes possible to conclude back on which beam is appropriate. Then, the values of the antenna weights can be determined in accordance with that beam. For example, the UE may determine the values for antenna weights used for reception based on a DL beam sweep; and/or may determine the values for antenna weights for UL transmission based on an UL beam sweep in combination with associated DL feedback control signaling from the BS. Likewise, the BS may determine the values for the antenna weights for reception based on an UL beam sweep; and/or may determine the values of the antenna weights for DL transmission based on a DL beam sweep and associated UL feedback control signaling from the UE. In particular in a scenario where reciprocity is assumed, it may be sufficient to rely on either a DL beam sweep or an UL beam sweep. Details of associated beam management including beam sweeps are, e.g., described in 3GPP TSG RAN WG1 meeting #86, R1-166089; R1-167466; R1-167543; R1-166389.

In CB operational mode, the UE may employ beamforming. The BS may employ beamforming.

Such CB operational mode typically allows for a high array gain at both ends of the wireless link, i.e., at the UE and the BS. This typically helps to improve the link budgets specifically in poorly-scattered scenarios. Typically, line of sight (LOS) propagation between UE and BS is often assumed at frequencies of the wireless link at about or above 6 GHz. Switch diversity gain is obtained by beam management. On the other hand, for CB operational mode, latency may increase, because typically, significant time is required to implement one or more beam sweeps. Further, feedback control signaling may be required which further increases the latency.

A second operational mode may be referred to as non-CB operational mode. The non-CB operational mode may—differently to the CB operational mode—not rely on predefined candidate values, but rather use a calculation using a receive property of a pilot signal—e.g., an uplink pilot signal and/or a downlink pilot signal, such as a sounding reference signal (SRS), a demodulation reference signal (DM-RS), or a Channel State Information Reference Signal—communicated between the UE and the BS as an input. Hence, the result space of potential values of antenna weights may not be discrete, but rather continuous. The result space may not be limited a priori by candidate values. The calculation may include a matrix inversion of a channel matrix. Specifically, the transmitted pilot signal may be known to the receiver and based on a comparison of the actual receive property with the corresponding transmit property, the channel matrix may be derived. The channel matrix may be indicative of any modification to the signal along the propagation path, e.g., fading, phase shifts, and/or path loss, etc. The receive property may include amplitude and/or phase. Then, based on the channel matrix—e.g., an inversion thereof to provide pre-coding to compensate for any influences of the channel on the signal—the appropriate values for the antenna weights may be determined. Typically, the non-CB operational mode may rely on UL pilot signals transmitted by the UE and received by the BS. Then, the BS can use the receive property of the UL pilot signals to determine the values for the antenna weights. Again, DL feedback control signaling to the UE may provide the UE with the values of the antenna weights, if even required. Typically, the respective pilot signals are repeatedly transmitted in certain predefined time-frequency resource elements. A corresponding transmission pattern can, e.g., be set UE-specific by the BS or may be broadcasted using information blocks. The more time-frequency resource elements are available for transmission of pilot signals, the more UEs can be accommodated. The pilot signals may be transmitted from a single antenna (here, zero values for the antenna weights of the other antennas may be selected); or precoded to be pseudo-omnidirectional. This may correspond to providing for a comparably wide width of the beam, e.g., larger than 120°, optionally larger than 260°, further optionally larger than 340°.

As a general rule, it would be possible that the same operational mode is activated for both the UL wireless link and the DL wireless link between the UE and the network. In other examples, it would be possible that the activation between different operational modes is performed independently for the UL wireless link and the DL wireless link. In such a scenario, a first one of the CB operational mode and the non-CB operational mode may be activated for the DL wireless link; and a second one of the CB operational mode and the non-CB operational mode may be activated for the UL wireless link. The first one of the CB operational mode and the non-CB operational mode may or may not be different from the second one of the CB operational mode and the non-CB operational mode. For example, CB operational mode may be activated for the DL wireless link and non-CB operational mode may be activated for the UL wireless link, or vice versa.

Typically, the non-CB operational mode uses the scattering richness to obtain, both, full diversity gain and full array gain at the BS. On the other hand, non-CB operational mode may provide for limited diversity or array gain at the UE. The non-CB operational mode may provide for a reduced latency if compared to the CB operational mode; this is because it is possible to determine the values of the antenna weights based on a single pilot signal. Further, the logic required at the UE may be limited, particularly if compared to the CB operational mode. For example, no array processing may be required, because it may be possible to transmit an UL pilot signal non-precoded, i.e., using single antennas or equal antenna weights for multiple antennas. Furthermore, it may not be even required to provide for multiple transceivers at the UE. This all helps to reduce power consumption at the UE, which may be of particular importance for battery-powered devices, such as Internet of Things (IOT) devices, etc. The robustness of the link can be increased for non-CB operational mode if compared to CB operational mode, because of the low latency. Therefore, time drifts can be compensated quickly. Pilot signals used for the non-CB operational mode may be transmitted at least partly time overlapping in different beams.

Thus, the CB operational mode may correspond to a trial-and-error test: here, candidate values of a plurality of candidate values are all tested by means of the beam sweep; and the best one is selected. Thus, even prior to sensing the channel, the potential result of the determination of the values for the antenna weights is known. Differently, the SRS based approach uses initial values for the antenna weights for transmission of the pilot signal; then, based on the receive property of the pilot signal, final values for the antenna weights are calculated, wherein the final values may differ from the initial values. Here, only after sensing the channel the result of the determination of the values for the antenna weights is available.

If a device includes multiple antenna patches, these multiple antenna patches may be operated simultaneously in accordance with either one of the available operational modes. In some examples, different operational modes may be activated for different antenna patches, sometimes also referred to as antenna panels.

As a general rule, it is possible that the BS activates different operational modes for different UEs connected to the respective cell. For example, the CB operational mode may be activated for a first UE and the non-CB operational mode may be activated for a second UE. Here, at least one of time division duplex, frequency division duplex, code division duplex, and spatial division duplex can be employed. For example, different UEs employing different operational modes may be scheduled to different frequencies sub bands or time occasions. Different UEs employing different operational modes may be spatially separated. The scheduling logic at the BS can implement respective functionality.

Various techniques are based on the finding that flexible activation of the non-CB operational mode or the CB operational mode can be beneficial for a wireless link occupying frequency resources above 6 GHz. For example, there may be situations where the signal quality on the wireless link is good—e.g., if the geographical distance between the BS at the UE is small—: then, it may be helpful to transition from the initially activated CB operational mode to the non-CB operational mode to reduce complexity and latency as long as the favorable signal quality is observed. On the other hand, for limited signal quality of the wireless link, the CB operational mode may be preferred, because, here, non-CB operational mode may be providing insufficient accuracy in determining the values of the antenna weights.

Figure 1:
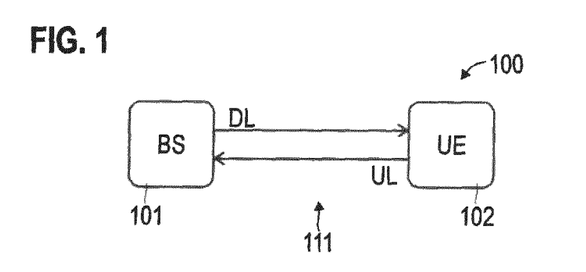
FIG. 1 schematically illustrates communication on a wireless link between a BS and a UE according to various examples.

FIG. 1 schematically illustrates a wireless communication network 100 that may benefit from the techniques disclosed herein. The network may be a 3GPP-standardized network such as 3G, 4G, or upcoming 5G NR. Other examples include point-to-point networks such as Institute of Electrical and Electronics Engineers (IEEE)-specified networks, e.g., the 802.11x Wi-Fi protocol or the Bluetooth protocol. Further examples include 3GPP NB-10T or eMTC networks.

The network 100 includes a BS 101 and a UE 102. A wireless link 111 is established between the BS 101—e.g., a gNB in the 3GPP NR framework—and the UE 102. The wireless link 111 includes a DL wireless link from the BS 101 to the UE 102; and further includes an UL wireless link from the UE 102 to the BS 101. Time-division duplexing (TDD), frequency-division duplexing (FDD), and/or code-division duplexing (CDD) may be employed for mitigating interference between UL and DL. Likewise, TDD, FDD, CDD and/or spatial division duplexing (SDD) may be employed for mitigating interference between multiple UEs communicating on the wireless link 111 (not shown in FIG. 1).

The wireless link 111 may occupy frequencies above 6 GHz. mmWave technology may be employed.

The UE 102 may be one of the following: a smartphone; a cellular phone; a tablet; a notebook; a computer; a smart TV; an MTC device; an eMTC device; an IoT device; an NB-IoT device; a sensor; an actuator; etc.

Figure 2:
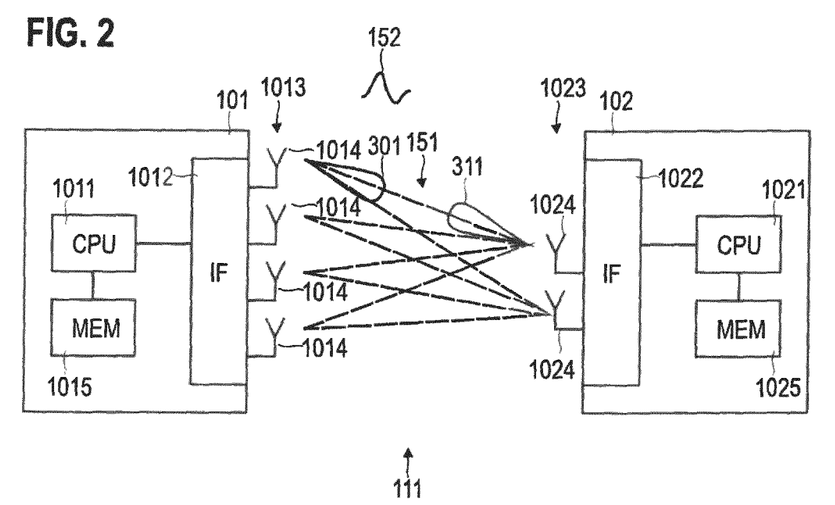
FIG. 2 schematically illustrates communication on a wireless link between a BS and a UE according to various examples, wherein FIG. 2 further illustrates multiple propagation paths associated with multiple beams.

FIG. 2 schematically illustrates the BS 101 and the UE 102 in greater detail. The BS 101 includes a processor 1011 and an interface 1012, sometimes also referred to as frontend. The interface 1012 is coupled via antenna ports (not shown in FIG. 2) with an antenna patch 1013 including a plurality of antennas 1014. In some examples, the antenna patch 1013 may include at least 30 antennas 1014, optionally at least 110 antennas, further optionally at least 200 antennas. Antenna panels are sometimes also referred to as antenna patch. Sometimes, a scenario implementing a large number of antennas 1014 is referred to as full dimension multi-input multi-output (FD-MIMO) or massive multi-input multiple-output (Massive MIMO, MaMi). Each antenna 1014 may include one or more electrical traces to carry a radio frequency current. Each antenna 1014 may include one or more LC-oscillators implemented by the electrical traces. Each trace may radiate electromagnetic waves with a certain beam pattern. In some examples the BS 101 may include multiple antenna patches.

The BS 101 further includes a memory 1015, e.g., a non-volatile memory. The memory may store program code that can be executed by the processor 1011. Executing the program code may cause the processor 1011 to perform techniques with respect to communicating one or more pilot signals, beam sweeps, and remote controlling UE beam management as disclosed herein. Thus, the processor 1011 and the memory 1015 form a control circuit.

The UE 102 includes a processor 1021 and an interface 1022, sometimes also referred to as frontend. The interface 1022 is coupled via antenna ports (not shown in FIG. 2) with an antenna patch 1023 including a plurality of antennas 1024. In some examples, the antenna patch 1023 may include at least 6 antennas, optionally at least 16 antennas, further optionally at least 32 antennas. Generally, the antenna patch 1023 of the UE 102 may include fewer antennas 1024 than the antenna patch 1013 of the BS 101. Each antenna 1024 may include one or more electrical traces to carry a radio frequency current. Each antenna 1024 may include one or more LC-oscillators implemented by the electrical traces. Each trace may radiate electromagnetic waves with a certain beam pattern. Also the UE 102 may include multiple antenna patches 1023.

The UE 102 further includes a memory 1025, e.g., a non-volatile memory. The memory 1025 may store program code that can be executed by the processor 1021. Executing the program code may cause the processor 1021 to perform techniques with respect to communicating one or more pilot signals, beam sweeps, and beam management as described herein. Thus, the processor 1021 and the memory 1025 form a control circuit.

FIG. 2 also illustrates aspects with respect to propagation channels 151. FIG. 2 schematically illustrates that different propagation channels 151 (dashed lines in FIG. 2) are implemented on the wireless link 111. The different propagation channels 151 are associated with different beams 301, 311 (in FIG. 2, for sake of simplicity, only a single beam 301 implemented by the UE 102 and a single beam 311 implemented by the UE 108 are illustrated). For example, to implement a certain propagation channel 151 for DL communication, a certain DL transmit beam may be selected for the antenna patch 1013 of the BS 101. Here, the beam may generally be implemented by certain values of the antenna weights of the antennas 1014, 1024/antenna ports of the respective antenna patch 1013, 1023. Sometimes, the antenna weights are also referred to as steering vectors or pre-coding parameters. Accordingly, different beams 301 may be addressed by using different amplitude and phase configurations for the various antennas 1014, 1024/antenna ports of the respective antenna patches 1013, 1023, i.e., different values for the antenna weights.

While in FIG. 2 line-of-sight propagation channels 151 are illustrated, in other examples, non-line-of-sight propagation channels 151 are possible.

Different ones of the propagation channels 151 may have different transmission characteristics such as number of reflections, path loss, and generally transmission reliability and/or capacity. In particular, different propagation channels 151 can have different fading profiles at the position of the respective receiver. Fading typically occurs due to destructive interference of reflected electromagnetic waves carrying the signals at the position of the receiver. Thus, the link performance will vary significantly depending on the selected beam 301/propagation channel 151. By using appropriate propagation channels 151—by determining the appropriate values for the antenna weights —, diversity can be provided to reduce fading. According to various examples described herein, selection of the appropriate values for the antenna weights is facilitated through flexible activation of the corresponding operational mode. The appropriate beam for transmission and/or reception is thereby determined and transmission on an appropriate propagation path 151 can be implemented.

Generally, such multi-beam operation is expected to be used in NR networks operated at carrier frequencies above 6 GHz. Here, the beams from both BS 101 and UE 102 should be aligned to avoid signal loss. To sound the wireless link 111 and the various propagation channels 152, one or more pilot signals 152 can be transmitted and received.

Such pilot signals as described herein may generally have a well-defined symbol sequence and/or transmission power such that based on a receive property of the pilot signals it is possible to sound the wireless link. Sometimes, the pilot signals may also be referred to as reference signals or synchronization signals. In certain scenarios, the pilot signals may be indicative of the beam 301, 311 on which they are transmitted. For example, in a CB operational mode, the base sequence used for a given pilot signal may be selected in accordance with the respective beam.

Figure 3:
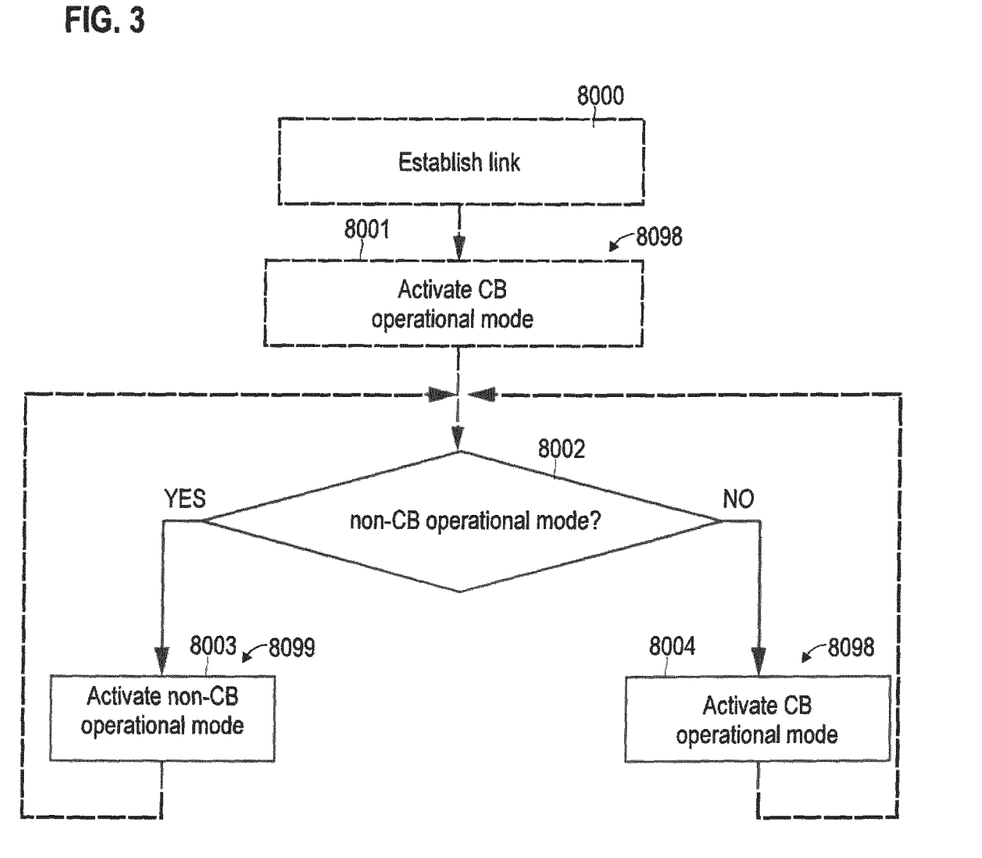
FIG. 3 is a flowchart of a method according to various examples.

FIG. 3 is a flowchart of a method according to various examples. For example, the method according to FIG. 3 may be executed by the control circuitry 1011, 1015 of the BS 101; and/or may be executed by the control circuitry 1021, 1025 of the UE 102. In FIG. 3, optional elements are indicated using dashed lines.

At optional block 8000, a wireless link is established between a BS of a network and a UE. For example, the wireless link 111 according to the example of FIG. 1 and FIG. 2 could be established. This block 8000 may include performing a random access procedure including transmission of a random access preamble and one or more Layer 3 control messages. Block 8000 may include setting up a radio bearer on the wireless link, e.g., a signaling radio bearer and/or a user plane radio bearer.

Next, at optional block 8001, the CB operational mode 8098 is implemented. Hence, it would be possible that, per default, in response to establishing the wireless link, the CB operational mode is activated.

Next, at block 8002, a selection is made between the CB operational mode 8098 and the non-CB operational mode 8099. In other words, in block 8002 it is checked whether non-CB operational mode 8099 should be activated; in the affirmative, at block 8003, the non-CB operational mode 8099 is activated—otherwise, in block 8004, the CB operational mode 8098 is activated.

As a general rule, various decision criteria are available for activating the CB operational mode or the non-CB operational mode in block 8002. In other words, various decision criteria are available for the selection at block 8002.

In one example, said activation of the CB operational mode or the non-CB operational mode may be based on a signal quality of the wireless link as a decision criterion. Specifically, the signal quality may be determined based on indicators such as a receive signal strength, a BER, a packet error rate, etc. There may be a tendency to activate the non-CB operational mode 8003 if the signal quality of the wireless link is better than a threshold. Namely, in such scenarios, it is expected that the non-CB operational mode may provide sufficiently accurate determination of the values of the antenna weights.

For example, in the scenario of FIG. 3, initially, in response to establishing the wireless link in block 8000, the CB operational mode 8098 may be activated at 8001. Then, at block 8002, the signal quality for communication on the wireless link may be determined, while the CB operational mode 8098 is active. This may involve determining a receive signal strength indicator, etc. Then, at block 8002, a threshold comparison for the determined signal quality may be performed. Here, the determined signal quality may be compared to a predefined threshold. For example, the threshold may be negotiated between the BS 101 and the UE 102, or may be fixedly set. Then, depending on the threshold comparison, either activation of the CB operational mode 8098 continues at block 8004; or the non-CB operational mode 8099 is newly activated at 8003. Such a two-stage approach helps to firstly reliably initiate the communication using the robust CB operational mode; and, subsequently, if the signal quality permits, the more lean and efficient non-CB operational mode may be activated.

Alternatively or additionally to such a decision criteria taking into account the signal quality of the wireless link, other decision criteria may also be considered in block 8002. A further example decision criteria includes a quality of service requirement of communication of the wireless link. For example, if certain payload data associated with a given service is communicated on the wireless link, then a more robust and fail-safe communication may be preferred. In such a case, activation of the CB operational mode 8098 may be appropriate. However, e.g., in case of best-effort data, it may be preferred to activate the non-CB operational mode 8099. Hence, in some scenarios, a latency requirement, failure tolerance requirement, service identity of an associated service, etc. may be taken into account in block 8002.

Alternatively or additionally, the following decision criterion can be taken into account in block 8002: the activation of the non-CB operational mode 8099 or the CB operational mode 8098 may be based on a power setting of the BS and/or a power setting of the UE. For example, typically, it is expected that the non-CB operational mode is associated with a lower power consumption if compared to the CB operational mode. Then, if an energy balance of the UE is restricted—e.g., due to limited state of charge and/or state of health of the battery—there may be a tendency to prefer activation of the non-CB operational mode 8099 at 8002. Further, a device category may be taken into account for determining the power setting. Specifically, MTC or IOT devices may typically require a particularly long battery lifetime. Again, this may result in a tendency of preferring activation of the non-CB operational mode 8099.

Yet another decision criterion that may be taken into account in block 8002 involves the distance—e.g., the geographical distance—between the UE and the BS. For example, a location of the UE may be determined, e.g., based on triangulation, round-trip time measurements, angle of arrival measurements, satellite positioning techniques, etc. Likewise, the location of the BS may be determined or may be predetermined. Then, the geographical distance can be determined from a comparison of the locations. Typically, if the geographical distance between the UE and the BS is small, then there may be a tendency to activate the non-CB operational mode. Namely, in such a scenario of a small geographical distance, it can be expected that the signal quality of communicating on the wireless link is good.

As illustrated in FIG. 3, it would be possible that block 8002 is re-executed, e.g., from time to time or according to one or more other trigger criteria. As a general rule, various trigger criteria for executing block 8002 are conceivable. Example trigger criteria include: a change of a signal quality of the wireless link exceeding a threshold; a change in the geographical distance between the UE and the BS exchanging a threshold; expiry of a respective timer; a trigger event according to a predefined timing schedule, e.g., in accordance with a predefined periodicity or, generally, frequency of occurrence; etc.

When the non-CB operational mode 8099 is implemented at block 8003, then, values of the antenna weights—e.g., for the BS and/or the UE—are determined based on a calculation using a receive property—e.g., amplitude and/or phase—off pilot signals communicated between the UE and the BS as an input. Differently, where the CB operational mode 8098 is implemented at block 8004, the respective values of the antenna weights are determined from a plurality of predefined candidate values.

The candidate values can be included in a CB, e.g., a network-controlled CB. The particular CB to be used may be statically fixed or may be announced by the BS. The CB can be cell-specific. The CB may include a finite and limited number of discrete candidate values. Therefore, the result space of values for the antenna weights is inherently limited when implementing the CB operational mode at block 8004. This may be different from the non-CB operational mode implemented when executing block 8003. Here, the corresponding calculation using the receive property of pilot signals as an input may not operate on a discrete, finite result space; but may yield different values for the antenna weights for different inputs. For example, a mapping of UL pilot signals to the instantaneous channel may be achieved by deriving the Gram matrix $G=HH^T$. H defines the channel. G is sometimes referred to as the channel correlation matrix and its eigenvector defines the eigenbeam. Thereby, a large time-resolution of the channel sounding may be achieved and small-scale fading is considered. Here, orthogonal pilot signals may be transmitted from the various antennas. Typically, the pilot signals used for the non-CB operational mode are generated using a base sequence. Here, cyclic shifts can be considered between different pilot signals. Zadoff-Chu sequences may be used. Generally, the power variation in time and frequency of the corresponding base sequence should be limited. In implementing the non-CB operational mode, feedback control signaling may be indicative of a channel matrix and/or the specific values of the antenna weights. The calculation may include a matrix inversion of the channel matrix. Typically, UL pilot signals are used. Then, the matrix inversion can be implemented at the BS.

Differently, when implementing the CB operational mode at 8004, a matrix inversion or, generally, a calculation—e.g., using some numerical or analytical evaluation of a predefined functional dependency—may not be required.

Rather, a DL beam sweep and/or an UL beam sweep may be performed. Here, pilot signals may be transmitted on the different beams of the respective beam sweep; the pilot signals may be indicative of the particular beam such that the receiving device can conclude back on which particular beam has been used for transmitting the respective pilot signal. Then, based on a comparison between receive properties of the received pilot signals associated with different beams, the most appropriate beam can be selected. Here, it is possible to determine the values of the antenna weights in accordance with the selected beam. Details with respect to such a beam sweep are illustrated in FIG. 4.

As a general rule, the selection between the non-CB operational mode 8099 and the CB operational mode 8098 at block 8002 may be implemented differently for the UL wireless link 111 and the DL wireless link 111—this may or may not result in a different operational mode 8098, 8099 being activated for the UL wireless link 111 and the DL wireless link 111. In other examples, the same selection may be executed for the UL and the DL wireless link 111, i.e., the same operational mode 8098, 8099 is necessarily activated for the UL and the DL.

Figure 4:
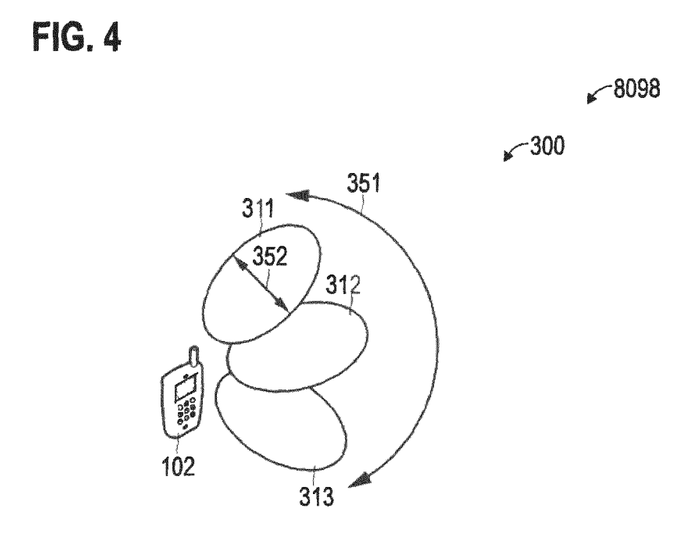
FIG. 4 schematically illustrates a beam sweep according to various examples.

FIG. 4 illustrates a beam sweep 300 of the UE 102. For example, the beam sweep 300 may be a receive beam sweep or transmit beam sweep. A receive beam sweep of the UE 102 may be time-aligned with the transmit beam sweep of the BS 101. A transmit beam sweep of the UE 102 may be time-aligned with a receive beam sweep of the BS 101. Thus, while the BS 101 is transmitting, the UE 102 may be configured to listen, and vice versa.

The beam sweep 300, in the example of FIG. 4, includes three beams 311, 312, 313. Thereby, a certain beam sweep angle 351 is implemented. The beam sweep angle 351 is achieved by the beam width 352 of each one of the beams 311-313. Depending on the particular beam sweep, the count of beams, the beam width 352, the beam sweep angle 351, etc., can vary.

The values of the antenna weights used for each one of the beams 311-313 are predefined in a corresponding CB. Then, e.g., if beam 312 shows a larger signal strength at the receiver if compared to beams 311 and 313, the values of the antenna weight used for subsequent communication on the wireless link 111 may be determined in accordance with the values of the antenna weights defining the beam 312.

Figure 5:
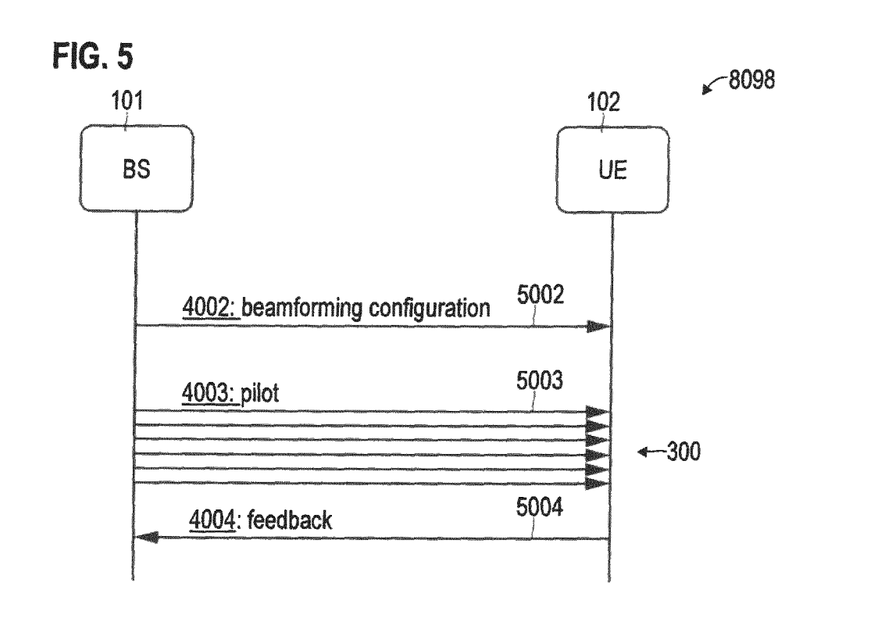
FIG. 5 is a signaling diagram associated with a downlink (DL) beam sweep according to various examples.

FIG. 5 illustrates aspects with respect to the CB operational mode 8004. FIG. 5 illustrates aspects with respect to a DL beam sweep 300. FIG. 5 is a signaling diagram of communication between the BS 101 and the UE 102 on the wireless link 111.

At 5002, a beamforming configuration control message 4002 is transmitted by the BS 101 and received by the UE 102. 5002 is optional. For example, the beamforming configuration control message may be indicative of time-frequency resources to be used for the beam sweep 300. For example, the beamforming configuration control message 4002 may be indicative of a count of beams used in the beam sweep 300. The beamforming configuration control message 4002 may be indicative of a CB to be used for the beams of the beam sweep 300. For example, indices of a CB may be indicated; then each index may correspond to respective values of the antenna weights.

Next, at 5003, the BS 101 transmits multiple DL pilot signals 4003. Different ones of the DL pilot signals 4003 are transmitted on different beams of the beam sweep 300. The beams may be in accordance with the beamforming configuration control message 4002. Each DL pilot signal 4003 may be indicative of the particular beam on which it has been transmitted. Thereby, the UE 102 can identify the particular beam of the beam sweep 300 which shows most favorable transmission characteristics. A respective feedback control signaling 4004 is implemented at 5004. For example, the feedback control signaling 4004 may be indicative of an index of the CB associated with the appropriate beam of the beam sweep 300. Then, the BS 101 may determine the values for the antenna weights by fetching the corresponding entry from the CB. Respective beamforming can then be applied for subsequent DL transmission and UL reception.

As a general rule, in the CB operational mode 8098 is not required that the UE 102 implements beamforming. However, in some scenarios, based on the assumption of reciprocity, the UE 102 may also perform beamforming by determining the values of the antenna weights in accordance with the appropriate beam of the beam sweep 300. Alternatively or additionally, an UL beam sweep may be performed.

Figure 6:
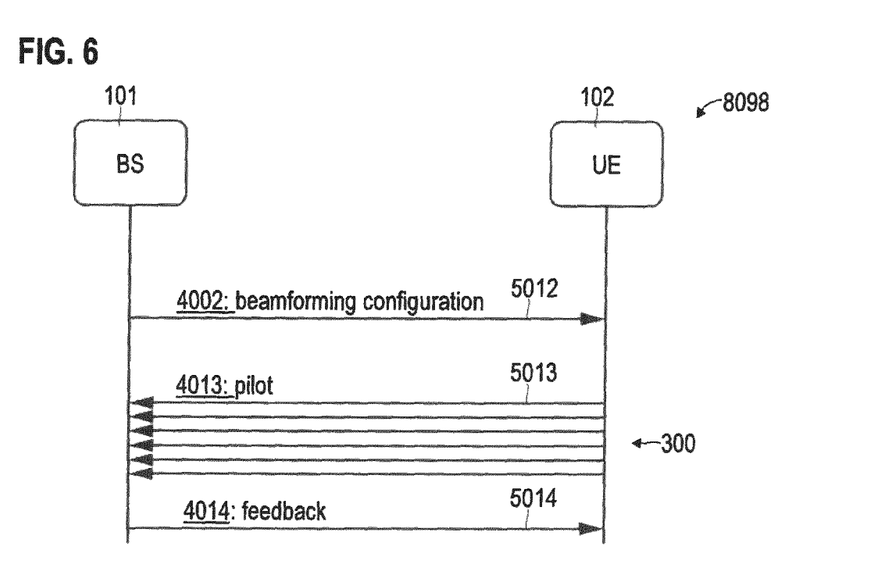
FIG. 6 is a signaling diagram associated with an uplink (UL) beam sweep according to various examples.

FIG. 6 illustrates aspects with respect to the CB operational mode 8004. FIG. 6 schematically illustrates aspects with respect to an UL beam sweep 300. FIG. 6 is a signaling diagram of communication between the BS 101 and the UE 102 on the wireless link 111.

5012 corresponds to 5002.

At 5013, UL pilot signals 4013 are transmitted by the UE 102 and received by the BS 101 in a corresponding UL beam sweep 300. Similar considerations as explained above with respect to the DL beam sweep 300 of the example of FIG. 5 also apply to the UL beam sweep 300 of the example of FIG. 6.

At block 5014, feedback control signaling 4014 is implemented in DL, based on receive properties of the UL pilot signals 4013 of the beam sweep 300. This again facilitates determining the values for the antenna weights by retrieving the corresponding entries from the CB in accordance with the appropriate beam identified in the beam sweep 300.

Figure 7:
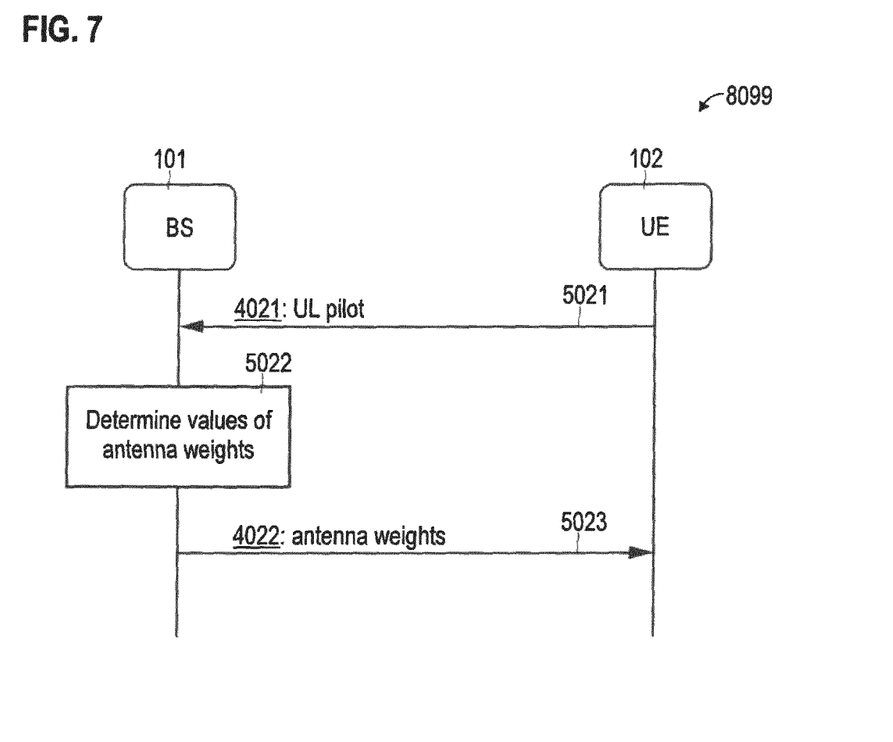
FIG. 7 is a signaling diagram of communication of an UL pilot signal according to various examples.

FIG. 7 illustrates aspects with respect to the non-CB operational mode 8003. FIG. 7 illustrates aspects with respect to determining antenna weights based on a calculation. FIG. 7 is a signaling diagram of communication between the BS 101 and the UE 102 on the wireless link 111.

At 5021, the UE 102 transmits an UL pilot signal 4021. The BS 101 receives the UL pilot signal 4021. For example, the UL pilot signal 4021 may be transmitted by a single antenna element 1024 of the UE 102. Here, it would be possible that the amplitude values of the antenna weights for the remaining antenna elements are set to zero. In other examples, pseudo-omnidirectional precoding may be used for transmitting the UL pilot signal 4021; here, the amplitude values for the antenna weights for the various antenna elements 1024 may be larger than zero such that a correspondingly large beam width can be achieved. It would also be possible to transmit multiple UL pilot signals 4021 using different beams.

In any case, the UL pilot signal 4021 is received by the BS 101. A corresponding receive property—e.g., amplitude and/or phase—is measured. Then, using the receive property as an input to a corresponding calculation, at 5022, the BS 101 determines the values for the antenna weights. This may involve a matrix inversion of the channel matrix.

Then, at 5023, a feedback control signaling 4022 may be implemented, albeit this is generally optional. This helps to determine the appropriate values for the antenna weights at the UE 102. While the non-CB operational mode 8003, in FIG. 7, is described with respect to the communication of an UL pilot signal 4021, in other examples, it would be possible to—alternatively or additionally to the UL pilot signal 4021—be possible to communicate a DL pilot signal from the BS 101 to the UE 102. Then, corresponding logic for executing the calculation may be situated at the UE 102.

Above, various scenarios have been described for activation of different operational modes. Different decision criteria have been explained which can serve as a basis for the decision taking in activation of a selected on of multiple operational modes. In any case, it may be desired to synchronize activation of the operational modes 8098, 8099 between the UE and the BS. For this, either the UE or the BS may take the lead in the activation; and then, the activation at the BS or the UE can be aligned with the lead decision. For example, FIG. 8 illustrates a scenario where the lead decision is taken at the BS 101.

Figure 8:
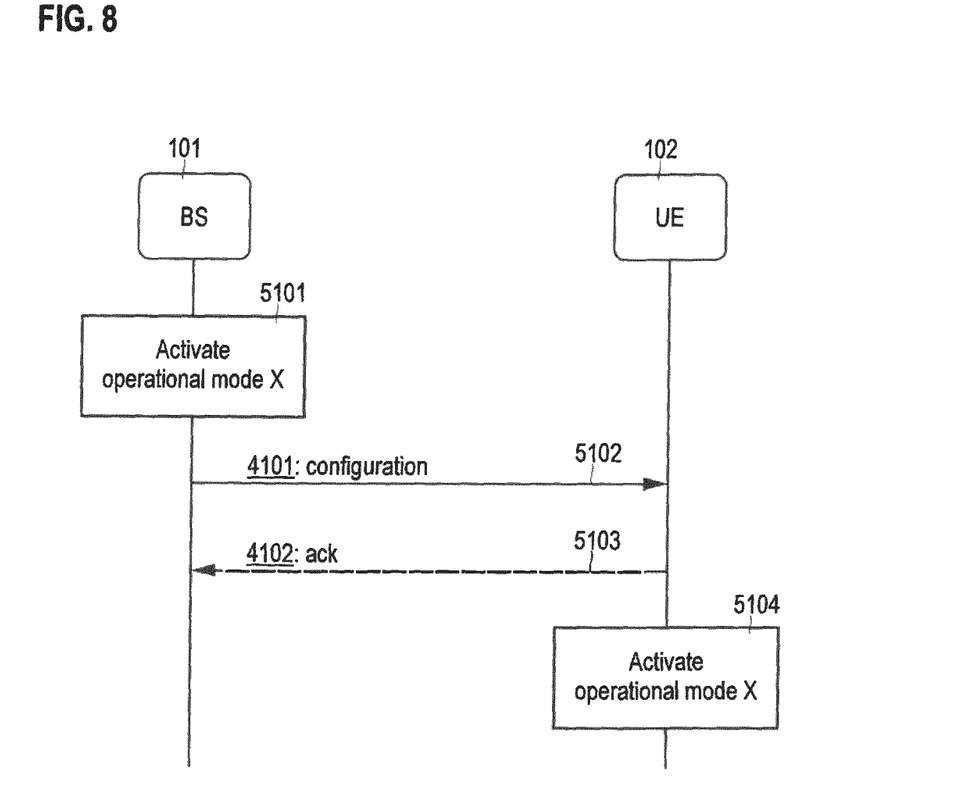
FIG. 8 is a signaling diagram of synchronizing activation of an operational mode between BS and UE according to various examples.

FIG. 8 illustrates aspects with respect to activation of different operational modes 8098, 8099 at the BS 101 and the UE 102. FIG. 8 is a signaling diagram of communication on the wireless link 111 between the BS 101 and the UE 102.

Initially, at 5101, the BS 101 activates a given operational mode, e.g., the CB operational mode 8098 or the non-CB operational mode 8099. Here, one or more decision criteria may be taken into account, e.g., as explained above with respect to block 8002 of FIG. 3.

Thus, the activation of the operational mode is network-triggered. This is because the network, i.e., in the scenario of FIG. 8, the BS 101, takes the lead.

Next, for synchronizing of the activation between the BS 101 and the UE 102, a DL control message 4101 indicative of the activated operational mode is transmitted by the BS 101 and received by the UE 102.

Optionally, at 5103, the UE 102 may transmit an acknowledgment control message 4102, indicating acceptance of the activation.

At 5104, the UE 102 then activates the same operational mode previously activated by the BS 101 at 5101, in accordance with the DL control message 4101.

Hence, as will be appreciated from FIG. 8, here the selection of the operational mode 8098, 8099 to be activated is primarily taken at the BS 101. In other examples, the selection of the of the operational mode 8098, 8099 to be activated is primarily taken by the UE 102. Such a scenario is illustrated in FIG. 9.

Figure 9:
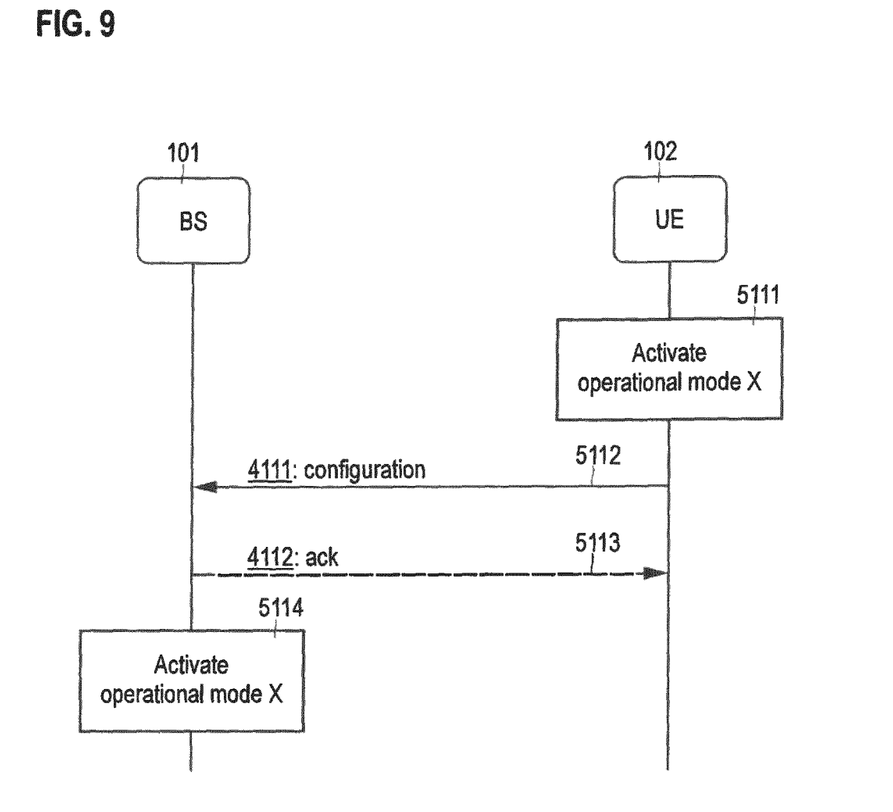
FIG. 9 is a signaling diagram of synchronizing activation of an operational mode between BS and UE according to various examples.

FIG. 9 illustrates aspects with respect to activation between different operational modes. The scenario of FIG. 9 generally corresponds to the scenario of FIG. 8. However, in the scenario of FIG. 9, the UE 102 takes the lead in the activation of a given operational mode, e.g., the non-CB operational mode 8099 or the CB operational mode 8098. As such, 5111 corresponds to 5101; 5112 corresponds to 5102; 5113 corresponds to 5103; and 5114 corresponds to 5104. As will be appreciated from FIG. 9, the activation of the appropriate operational mode 8098, 8099 is UE-triggered and activation at the BS 101 is in accordance with the respective UL control message 4111 communicated at 5112. Again, the acknowledgment control message 4112 communicated at 5113 is optional.

The activation of the operational modes 8098, 8099 according to the examples of FIGS. 8 and 9 may be for the UL wireless link and/or the DL wireless link. As a general rule, different ones of the available operational modes 8098, 8099 may be activated for the UL wireless link and the DL wireless link.

Figure 10:
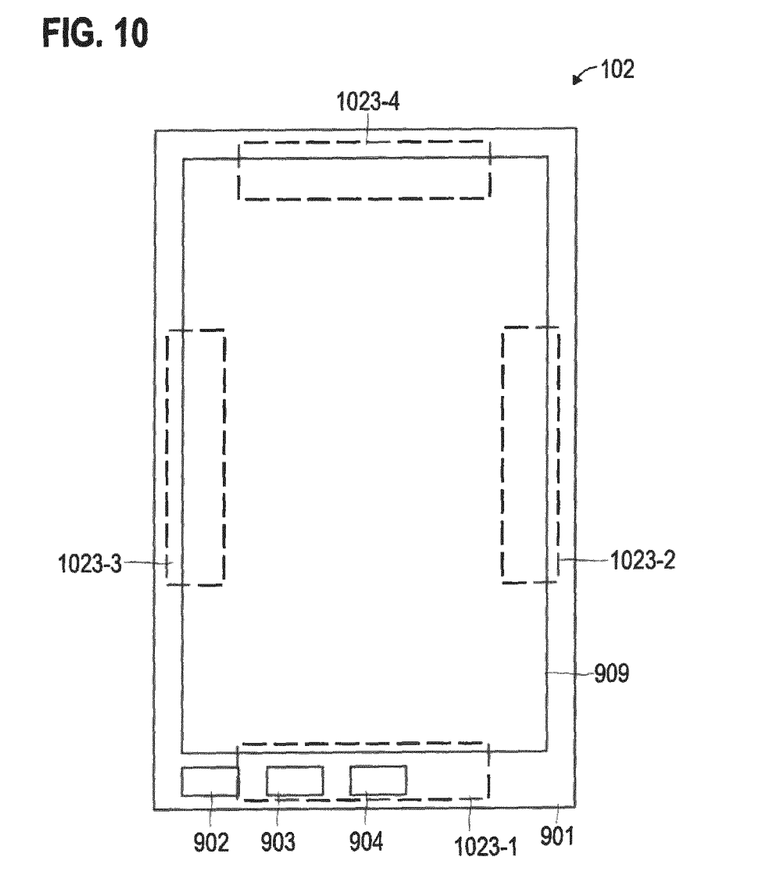
FIG. 10 schematically illustrates a UE including multiple antenna patches according to various examples.

FIG. 10 illustrates aspects with respect to the UE 102. In particular, FIG. 10 is a top view of the UE 102. The UE 102 includes a display 909, a housing 901, and buttons 902-904. In FIG. 10, it is illustrated that different antenna patches 1023-1-1023-4 are arranged at different sides of the housing 901. Therefore, beams defined by the different patches 1023-1-1023-4 will have effectively different orientations; for example, beams transmitted by using antennas of the patch 1023-1 may be orientated effectively towards the bottom of FIG. 10; while beams transmitted by using antennas of the patch 1023-4 may be orientated effectively towards the top of FIG. 10. Each antenna patch 1023-1-1023-4 defines a phased array of antenna elements (FIG. 10 does not illustrate the antenna elements for sake of simplicity).

In the various scenarios described herein, it would be generally possible to activate different channel sounding operational modes—e.g., the operational modes 8098, 8099—for different antenna patches 1023-1-1023-4. This may help to flexibly tailor the operational mode depending on the signal quality, or any other appropriate decision criteria, on a per-antenna patch basis. The overall energy consumption can be reduced. Latency and complexity can be tailored.

Summarizing, above techniques have been described which facilitate flexible activation of different operational modes of a wireless link, specifically for scenarios where the wireless link occupies resources at comparably high frequencies, e.g., at and above 6 GHz. Scenarios have been described, where it is possible to activate a CB operational mode or a non-CB operational mode.

Although the invention has been shown and described with respect to certain preferred embodiments, equivalents and modifications will occur to other skilled in the art upon the reading and understanding of the specification. The present invention includes all such equivalents and modifications and is limited only by the scope of the appended claims.

For illustration, various examples of the non-CB operational mode have been described with respect to use of UL pilot signals. However, the non-CB operational mode may also be implemented by using DL pilot signals.

For further illustration, various scenarios have been described in which the operational modes are non-CB operational mode and CB operational modes. However, in other scenarios further channel sounding operational modes may be used instead or in addition. For example, selection between more than two operational modes may be available. For example, in one scenario, a first channel sounding operational mode may be implemented by network-controlled determination of the values for the antenna weights; while a second channel sounding operational mode may be implemented by UE-controlled determination of the values for the antenna weights. For example, a first channel sounding operational mode may correspond to using beamforming at the UE; and a second channel sounding operational mode may correspond to not using beamforming at the UE. Different such operational modes may be activated, e.g., depending on certain decision criteria.

The invention claimed is:
1. A method of operating a device, comprising:
activating an operational mode of a plurality of operational modes of a wireless link established between a terminal and a base station of a network, wherein the plurality of operational modes includes both a first operational mode that utilizes a plurality of predefined candidate values in determining antenna weights, and a second operational mode that employs a calculation in determining antenna weights, in response to activating the first operational mode of the plurality of operational modes: determining first values for the antenna weights from the plurality of predefined candidate values, and in response to activating the second operational mode of the plurality of operational modes: determining second values for the antenna weights based on the calculation using a receive property of pilot signals communicated between the terminal and the base station as an input, wherein said activating of the first operational mode or the second operational mode is based on a signal quality of the wireless link and wherein said activating of the first operational mode or the second operational mode is based on a quality of service requirement corresponding to a certain payload data associated with a given service being communicated on the wireless link.

2. The method of claim 1, further comprising:

activating the first operational mode in response to establishing the wireless link, determining the signal quality for communication on the wireless link in the first operational mode, performing a threshold comparison of the determined signal quality, and depending on the threshold comparison: activating the second operational mode.

3. The method of claim 1,
wherein said activating of the first operational mode or the second operational mode is based on a power setting of at least one of the base station and the terminal.

4. The method of claim 1,
wherein said activating of the first operational mode or the second operational mode is based on a geographical distance between the base station and the terminal.

5. The method of claim 1,
wherein said activating of the first operational mode or the second operational mode is network-triggered in accordance with a respective downlink control message.

6. The method of claim 1,
wherein said activating of the first operational mode or the second operational mode is terminal-triggered in accordance with a respective uplink control message.

7. The method of claim 1,
wherein the plurality of candidate values are included in a codebook.

8. The method of claim 1,
wherein the first values for the antenna weights are determined in accordance with at least one of a downlink beam sweep and an uplink beam sweep.

9. The method of claim 1,
wherein the receive property comprises at least one of amplitude and phase of uplink pilot signals,
wherein the calculation comprises a matrix inversion of a channel matrix determined based on the receive property.

10. The method of claim 1,
wherein the wireless link occupies resources at frequencies above 6 GHz.

11. The method of claim 1,
wherein said activating of the first operational mode or the second operational mode is performed for multiple antenna patches, each antenna patch comprising a respective antenna array.

12. The method of claim 1,
wherein the wireless link comprises an uplink wireless link and a downlink wireless link, wherein activation of the first operational mode or the second operational mode is performed independently for the uplink wireless link and the downlink wireless link, wherein a first one of the first operational mode and the second operational mode is activated for the uplink wireless link, and wherein a second one of the first operational mode and the second operational mode is activated for the downlink wireless link.

13. A device comprising control circuitry configured to perform:

activating an operational mode of a plurality of operational modes of a wireless link established between a terminal and a base station of a network, wherein the plurality of operational modes includes both a first operational mode that utilizes a plurality of predefined candidate values in determining antenna weights, and a second operational mode that employs a calculation in determining antenna weights, in response to activating the first operational mode of the plurality of operational modes: determining first values for the antenna weights from the plurality of predefined candidate values, and in response to activating the second operational mode of the plurality of operational modes: determining second values for the antenna weights based on the calculation using a receive property of pilot signals communicated between the terminal and the base station as an input, wherein said activating of the first operational mode or the second operational mode is based on a signal quality of the wireless link and wherein said activating of the first operational mode or the second operational mode is based on a quality of service requirement corresponding to a certain payload data associated with a given service being communicated on the wireless link.

14. The device of claim 13,
wherein the device is the terminal or the base station.

* * * * *